United States Patent
Lefebvre (12)

(10) Patent No.: US 8,881,133 B2
(45) Date of Patent: Nov. 4, 2014

(54) METHOD FOR SERVICING A FIELD DEVICE OF AUTOMATION TECHNOLOGY

(75) Inventor: Martine Lefebvre, Blotzheim (FR)

(73) Assignee: Endress + Hauser Flowtec AG, Reinach (CH)

( * ) Notice: Subject to any disclaimer, the term of this patent is extended or adjusted under 35 U.S.C. 154(b) by 1288 days.

(21) Appl. No.: 12/452,843

(22) PCT Filed: Jul. 10, 2008

(86) PCT No.: PCT/EP2008/058962
§ 371 (c)(1),
(2), (4) Date: Apr. 19, 2010

(87) PCT Pub. No.: WO2009/013140
PCT Pub. Date: Jan. 29, 2009

(65) Prior Publication Data
US 2010/0293539 A1    Nov. 18, 2010

(30) Foreign Application Priority Data
Jul. 25, 2007    (DE) .................. 10 2007 035 158

(51) Int. Cl.
*G06F 9/445* (2006.01)
*G06F 9/44* (2006.01)
*G05B 19/042* (2006.01)
*G05B 19/05* (2006.01)

(52) U.S. Cl.
CPC .. *G05B 19/0426* (2013.01); *G05B 2219/31121* (2013.01); *G05B 2219/31132* (2013.01); *G05B 19/056* (2013.01); *G05B 2219/25428* (2013.01); *G05B 2219/34262* (2013.01)

USPC ............ 717/174; 717/100; 717/168; 717/178

(58) Field of Classification Search
CPC ................ G06F 8/20; G06F 8/61; G06F 8/65
See application file for complete search history.

(56) References Cited

U.S. PATENT DOCUMENTS

| 6,278,960 B1 * | 8/2001 | De Groot ...................... 702/188 |
| 6,418,554 B1 * | 7/2002 | Delo et al. .................... 717/174 |
| 7,627,860 B2 * | 12/2009 | Kodosky et al. .............. 717/141 |

(Continued)

FOREIGN PATENT DOCUMENTS

| WO | WO 2004/042482 A1 | 5/2004 | |
| WO | WO2004042482 | * 5/2004 | ............. G05B 19/05 |

OTHER PUBLICATIONS

Kim et al., SmartGlue: an interface controller with auto reconfiguration for field programmable computing machine, Jan. 2004, 3 pages.*

(Continued)

*Primary Examiner* — Thuy Dao
(74) *Attorney, Agent, or Firm* — Bacon & Thomas, PLLC

(57) ABSTRACT

A method for servicing a field device of automation technology with an operating program comprising a frame application and executable software components designed for the field devices and encapsulating the servicing functionalities of field devices. The software component designed for the field device is divided in two and comprises a basic software component and a software extension component, wherein the basic software component serves for reading and writing of device parameters of the field device and provides a graphical, basic, user interface, and the software extension component is produced from the program code of the device software of the field device and delivers the service functionality of the field device.

6 Claims, 3 Drawing Sheets

(56) References Cited

U.S. PATENT DOCUMENTS

| | | | |
|---|---|---|---|
| 8,060,872 B2* | 11/2011 | Da Silva Neto | 717/177 |
| 8,381,165 B2* | 2/2013 | Wittmer et al. | 717/100 |
| 8,443,355 B2* | 5/2013 | Wiese et al. | 717/168 |
| 2008/0313629 A1* | 12/2008 | Vetter et al. | 717/174 |
| 2009/0164989 A1* | 6/2009 | Schwalbe | 717/178 |
| 2009/0177970 A1* | 7/2009 | Jahl et al. | 715/735 |
| 2011/0231531 A1* | 9/2011 | De Groot | 709/221 |

OTHER PUBLICATIONS

T. Takeuchi, FDT technology for proprietary protocol field devices, 2009, 4 pages.*

A. Ito, Device configuration software development on EDDL and FDT/DTM environment, 2008, 4 pages.*

Zielinski, M.: Digital fieldbus installations use EDDL for simplicity with advanced, full functionality. "Computing & Control Engineering Journal", Dec. 6, 2004-Jan. 2005.

* cited by examiner

METHOD FOR SERVICING A FIELD DEVICE OF AUTOMATION TECHNOLOGY

TECHNICAL FIELD

The invention relates to a method for servicing a field device of automation technology.

BACKGROUND DISCUSSION

In automation technology (process automation, manufacturing automation), field devices are often applied, which serve for registering and/or influencing process variables. Examples of such field devices for process automation technology are fill level measuring devices, mass flow measuring devices, pressure, and temperature, measuring devices, pH, and redox-potential, measuring devices, conductivity measuring devices, etc., which, as sensors, register the corresponding process variables, fill level, flow, pressure, temperature, pH-value, or conductivity value.

Serving for influencing process variables actuators are, e.g. valves, which control the flow of a liquid in a pipeline section, or pumps, which change the fill level in a container.

A large number of such field devices are produced and sold by the firm, Endress+Hauser®.

Frequently, field devices are connected with superordinated units via fieldbus systems (Profibus®, Foundation® Fieldbus, HART®, etc.). These superordinated units serve, on the basis of corresponding programs, for process control, process visualizing, for servicing the field devices and for plant management (asset-management).

The integration of field devices into such applications occurs via device descriptions. These device descriptions are provided by the device manufacturers, in order that the applications can interpret e.g. the meaning of output delivered from the field devices.

There are different device descriptions for the different fieldbus systems (HART device descriptions, Fieldbus Foundation device descriptions, Profibus device descriptions).

On the basis of the cooperation of the Fieldbus Foundation (FF), the HART Communication Foundation (HCF) and the Profibus Nutzerorganisation (User Organization) (PNO), an electronic device description (EDD) was created, which is defined in the standard IEC 61804-2.

For servicing the field devices, corresponding operating programs (operating tools) are necessary, which run either self-sufficiently in the superordinated units (FieldCare of Endress+Hauser, Pactware, AMS of Fisher-Rosemount, PDM of Siemens) or integrated in control system applications (Siemens' PCS7, ABB's Symphony, Emerson's Delta V).

For comfortable servicing of the field devices, recently, special device descriptions, so called device DTMs (Device Type Manager), which correspond to the FDT (Field Device Tool) specifications, have become obtainable. The FDT specifications were developed as an industrial standard by PNO (Profibus User Organisation) in cooperation with ZVEI (Zentralverband Elektrotechnik- and Elektroindustrie, or German Electrical and Electronics Manufacturers' Association). The current FDT-Specification 1.2.1, including the addendum for "Foundation Fieldbus" communication, is obtainable from ZVEI, or PNO, or the FDT-Group.

Many field device manufacturers already deliver device DTMs for their field devices. The device DTMs encapsulate functions and variables of a given field device and provide, most often, a graphical user interface.

Device DTMs are software components, which, however, are not independently executable. As runtime environment, the device DTMs require a frame application (also referred to as an FDT-frame), e.g. FieldCare of the firm, Endress+Hauser. The frame application and the corresponding device DTMs represent an operating program for field devices, which enables very comfortable accessing of field devices (e.g. device parameters, measured values, status information, etc.), as well as the invoking of special functions (e.g. diagnosis).

The providing of device DTMs is, however, associated with considerable effort for the field device manufacturers. For the case, in which the program code must be newly written for a device DTM, such can, depending on the complexity of the field device, require a developmental time of a number of weeks.

Once device DTMs are done, they must be extensively tested, in order to assure, that they will work without problem with the relevant field device, or device type, and reflect its functionality correctly.

These tests also have a safety related aspect, since, via device DTMs, also safety-critical parameters can be adjusted in field devices. Secure and reliable servicing is an essential requirement in the development of device DTMs.

If the device software of a field device is changed, then, frequently, also the device DTM for the field device must be rewritten, which leads to additional effort on the part of the field device manufacturers.

In the development of device DTMs, field device manufacturers frequently start with already present, device descriptions (e.g. HART DDs). The firm, CodeWrights, in Karlsruhe, Germany produces device DTMs in large number based on HART-DDs. Complex functionalities (such as e.g. complex calculations for a device diagnosis) can, however, not be recreated with the assistance of HART-DDs. These functionalities are, thus, missing in the corresponding device DTMs. If these complex functionalities should also be integrated into the device DTMs, a complex reworking of the corresponding program code is necessary.

An important requirement in the case of device servicing is offline servicing. In such case, a field device, which is to be serviced, is either not at all physically connected with the superordinated unit in which the operating program is running, or it is not accessible from the operating program, because it is still not integrated into the fieldbus system. In spite of this, the user would like to already input device parameters for this field device.

In order to enable a complete offline servicing, very great effort is necessary in the creation of the device DTMs. As a rule, no hundred percent offline servicing can be assured with conventional device DTMs.

SUMMARY OF THE INVENTION

An object of the present invention is to provide, for servicing a field device of automation technology, a method, which does not have the above named disadvantages and which, especially, enables simple and safe servicing of field devices.

This object is achieved by the method steps including dividing the software component designed for the field device in two, into a basic software component and into a software extension component; using the basic software component for reading and writing of device parameters of the field device and as a graphical, basic user interface; and using the software extension component produced from the program code of the device software to deliver the service functionality of the field device.

Various embodiments of the invention are set forth in the following discussion.

An essential idea of the invention is to embody in two parts the software components (e.g. device DTMs) applied to this point for servicing field devices. Thus, on the one hand, a basic software component is provided and, supplementally, a software extension component. The basic software component offers only a few functionalities and runs, like the software components used to this point, in a frame application. It enables the reading and writing of device parameters and provides a graphical, basic, user interface. Additionally, a software extension component is provided, which is produced from the program code of the device software and delivers the actual service functionality of the field device.

In a first embodiment of the invention, the software extension component delivers the properties of the device parameters required for presention on the graphical, basic, user interface.

In a further development of the invention, the software extension component serves for calculating menu structures, which are presented on the graphical, basic, user interface.

The invention is especially suited for operating, or servicing, programs, which are based on the FDT-standard. In this case, the basic software component is a device DTM, which meets the FDT-specifications. The software extension is embodied as a Windows DLL (Dynamic Link Library) file. In order to assure consistency of the functionality of the device and the software extension component, in each reading and writing of device parameters, the corresponding values of the device parameters are transmitted to the software extension component.

Essential advantages, which the method of the invention offers, include that no complicated software components more must be produced for the servicing of field devices. The software extension component is directly produced from the program code of the device software. In this way, no additional developmental effort arises for producing the software components. The test effort is also significantly lessened, since equal functionality is assured, because the software extension component and the device software operate based on the same program code.

BRIEF DESCRIPTION OF THE DRAWINGS

The invention will now be described in greater detail on the basis of an example of an embodiment illustrated in the drawing.

The figures of the drawing show as follows.

DETAILED DISCUSSION IN CONJUNCTION WITH THE DRAWINGS

Figure 1:
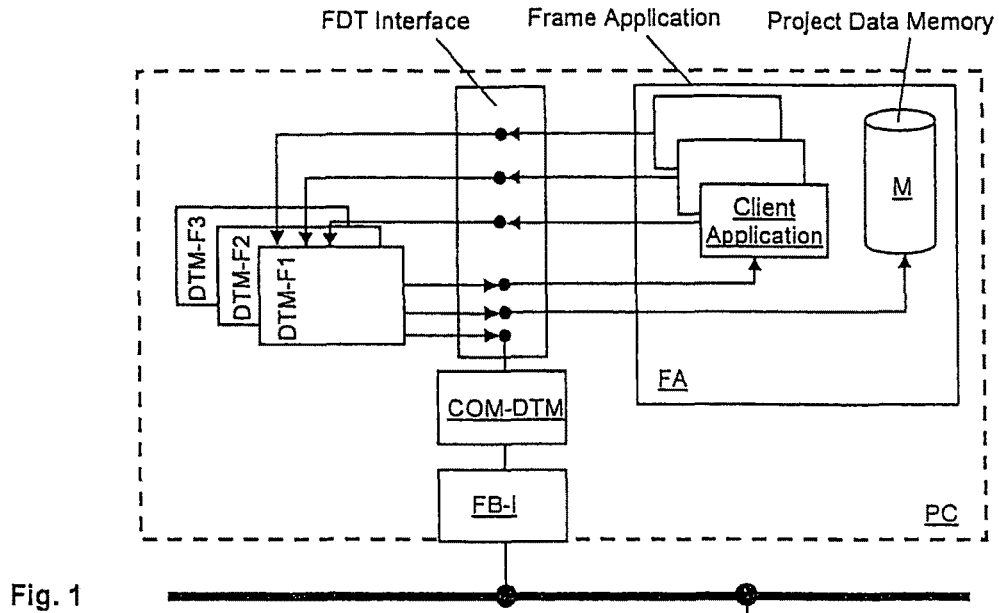
FIG. 1 is a conventional servicing of a field device of process automation technology with a computer unit.

FIG. 1 shows schematically the components needed for servicing a field device F1. As a rule, servicing occurs with the assistance of a computer unit CU. The computer unit CU can be e.g. a personal computer PC with a Windows operating system. The computer unit CU is connected with a fieldbus FB via a fieldbus interface FB-I, to which the field device F1 is connected. Running on the computer unit CU is a frame application FA (e.g. FieldCare of the firm, Endress+Hauser), which, via defined interfaces (FDT-interfaces), communicates with a device DTM, DTM-F1, designed for the field device F1. Other device DTMs, DTM-F2 and DTM-F3, for field devices F2 and F3 not shown in greater detail are also present.

Via a communication DTM, COM-DTM, the device DTM, DTM-F1, is connected with the fieldbus interface FB-I. For servicing the field device F1, the device DTM must be instantiated for the field device of concern, in this case, the device DTM, DTM-F1. The frame application FA is responsible for instantiating. The frame application FA is also responsible for starting and managing applications (client applications), for the memories and for the loading of project data from a project data memory M. After the device DTM, DTM-F1, is instantiated, the user has available, for servicing the field device F1, an operating program OP with a graphical user interface delivered by the device DTM, DTM-F1. Besides the graphical user interface (GUI), the device DTM, DTM-F1, also makes available the business logic of the field device F1. Via the communication DTM, COM-DTM, a connection to the field device F1 can be established, which enables reading and writing of device parameters.

The field device F1 transmits only parameter values and no properties of these values, such as e.g. text descriptions, such as "volume flow", formats, units or selection menus. These properties must be delivered by the device DTM, DTM-F1, and can then be presented on the user interface.

The servicing of individual field devices occurs with the assistance of the service, or operating, program OP, which is running on the computer unit CU. The operating program OP is composed of the frame application FA and different device DTMs as software components. The device DTMs for the field devices encapsulate their service functionality.

In the case of the offline servicing, e.g. the field device F1 is physically not present. Offline servicing occurs only with the assistance of the device DTM, DTM-F1.

Figure 2:
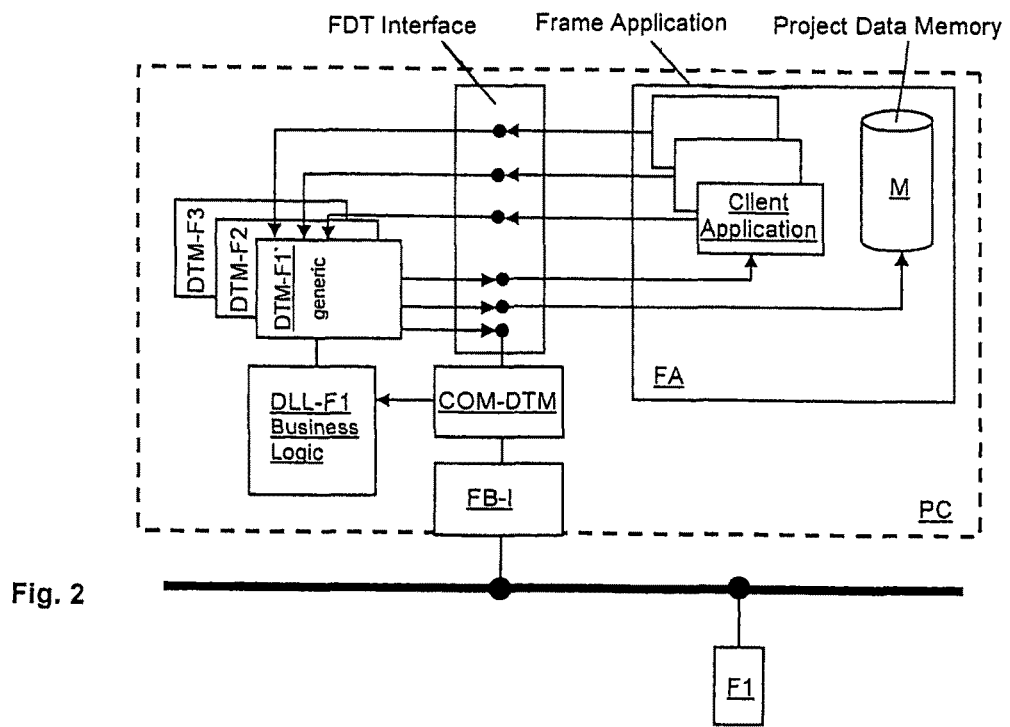
FIG. 2 is a servicing of the invention of a field device of process automation technology with a computer unit.

FIG. 2 is identical to FIG. 1, except for the device DTM, DTM-F1.

Instead of the device DTM, DTM-F1, a device DTM, DTM-F1' and an additional software component DLL-F1 are provided.

Instead of a one-piece software component, here a software component divided in two is used, which is composed of the device DTM, DTM-F1', as basic software component, and the additional software component DLL-F1, as software extension component.

With the help of the basic software component DTM-F1', device parameters of the field device F1 can be read, or written. Therewith, among other things, also an identification of the field device F1 is possible. For instance, the manufacturer ID, the device ID and the software revision number can be read out. Following identification of the field device F1, search can be made in the registry of the Windows operating system for the software extension component DLL-F1 of the field device F1, in order to load such.

The basic software component DTM-F1' provides, moreover, a basic user interface. Since the basic software component DTM-F1' provides only minimal functionality, it can also be termed a generic device DTM.

The DLL-F1 communicates with the device DTM, DTM-F1', and the communication DTM, COM-DTM, via internal Windows interfaces. For servicing the field device F1, both the device DTM, DTM-F1', and also the DLL-F1 are required. The actual service functionality of the field device F1 is provided in such case by the software extension component DLL-F1. Thus, the DLL-F1 delivers, among other things, text descriptions for device parameters, their format, their units, as well as selection menus. One can view the DLL-F1 as the business logic of the field device F1. Via the Windows interface, all representationally relevant information can be queried from the software extension component DLL-F1.

If the field device is online, then, at the beginning of the servicing, an upload of all device parameters is performed. In such case, all device parameters are, such as will be explained below in greater detail, simultaneously transmitted also into the software extension component DLL-F1.

If the field device is offline, then the current device parameters are not available.

In principle, also a virtual COM-port as interface could be provided for communication with the DLL-F1.

More sensible, however, is to access the software extension component DLL-F1 directly via the application layer of this virtual field device.

Figure 3:
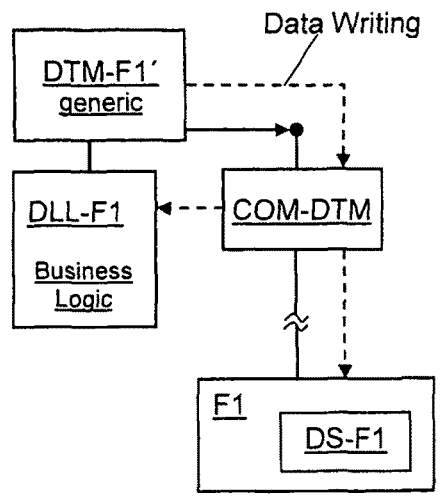
FIG. 3 is a schematic drawing of the writing of device parameters.

FIG. 3 shows, schematically, the writing of device parameters. If the device DTM, DTM-F1', produces a write command for a device parameter, then this together with the value of the device parameter are forwarded via the communication DTM, COM-DTM, to the field device F1 and transferred to the device software DS-F1, which executes the write command. The communication DTM, COM-DTM, forwards this write command, however, also simultaneously to the DLL-F1, so that the same device parameter is also written into the DLL-F1 with the same value. If of concern is the device parameter, units, with which the measured value of the field device F1 is output, then such is changed both in the field device F1, as well as also in the DLL-F1. Correspondingly changed are also device parameters dependent on the units, both in the field device F1, as well as also in the DLL-F1. Dependent device parameters can be, for example, limit values.

Figure 4:
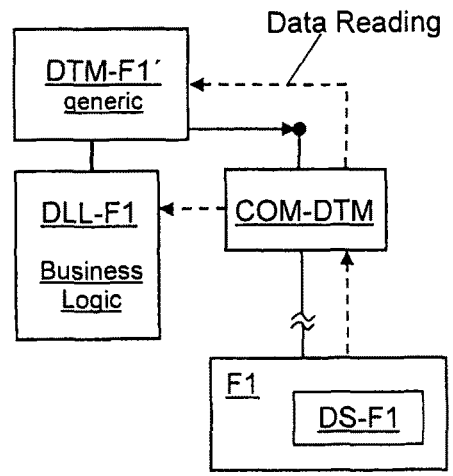
FIG. 4 is a schematic drawing of the reading of device parameters.

FIG. 4 shows, schematically, the reading of device parameters. In such case, a read command is transmitted to the field device F1 and the corresponding value forwarded from the field device F1 via the communication DTM, COM-DTM, to the generic device DTM, DTM-F1'. Also in this case, the value of the device parameter is forwarded to the DLL-F1. Thus, consistency between the functionality of the field device F1 and the DLL-F1 is assured.

In the case of an offline servicing, the field device F1 of FIGS. 2 to 4 is not physically present. The writing and reading of device parameters occurs then only between the device DTM, DTM-F1', and the software extension component DLL-F1.

Figure 5:
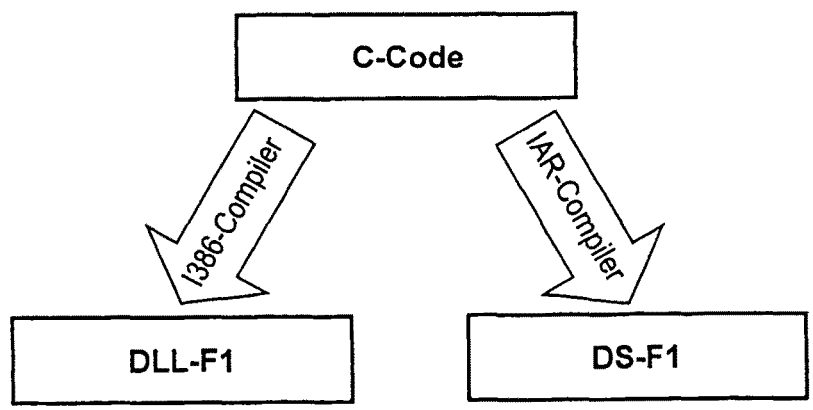
FIG. 5 is a schematic drawing of the device software and the DLL file for a field device.

FIG. 5 shows, schematically, how the DLL-F1 and the device software DS-F1 are generated. Both are derived from the same program code (C-code). The DLL-F1 is obtained via a standard Intel I386 compiler and the device software DS-F1 via an IAR compiler. In automation technology, the device software for many field devices is produced with such a compiler.

Figure 6:
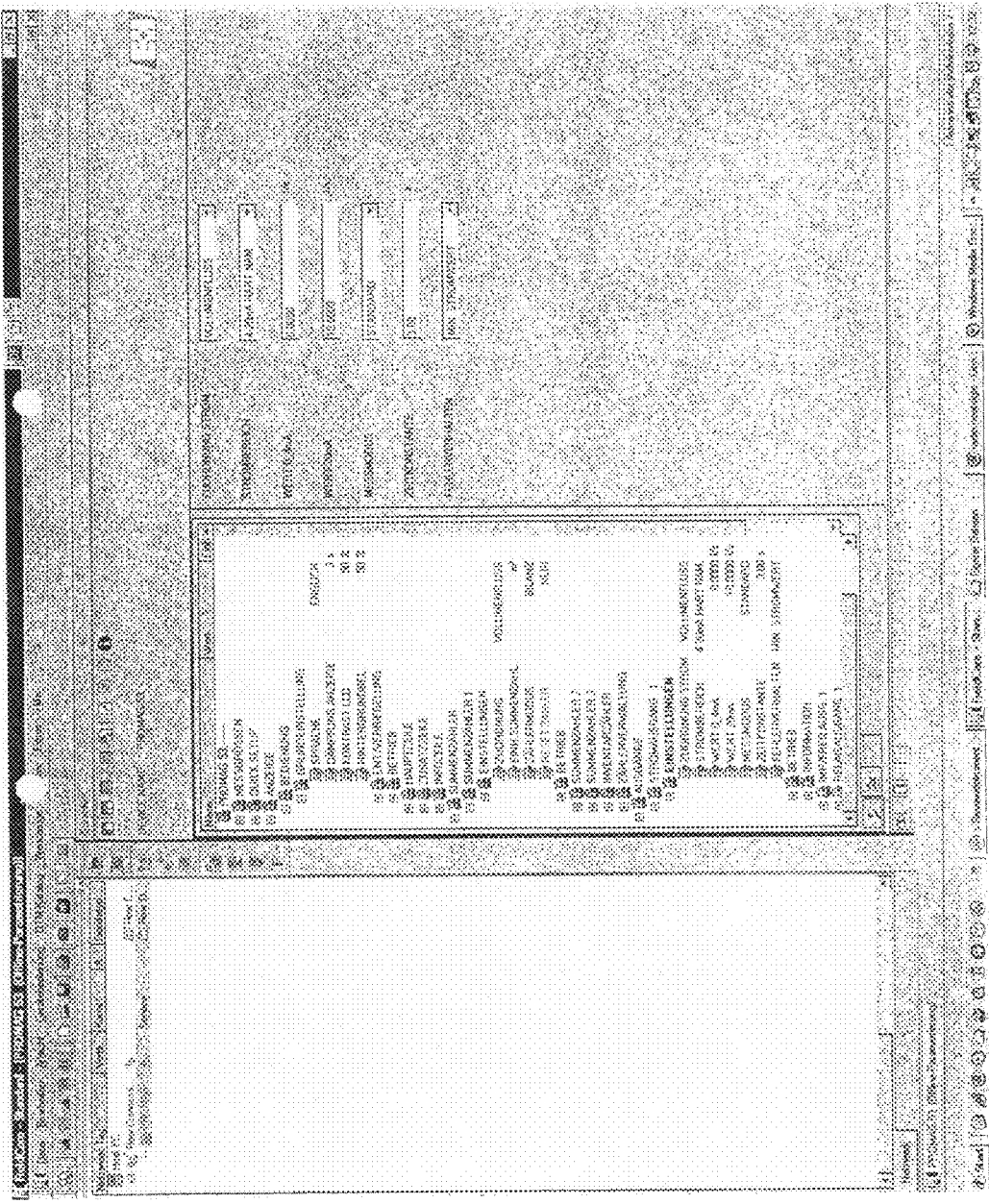
FIG. 6 is an illustration of the user interface for servicing a field device (Promag 53 of Endress+Hauser).

FIG. 6 shows a graphical user interface for a field device, wherein the field device is a Promag 53 field device of the firm, Endress+Hauser. The basic user interface is delivered by the generic device DTM, DTM-F1'.

The menu structure originates from the DLL-F1. Selected in the menu structure is the point "settings". In the servicing, for example, the association, electrical current, can be selected via a combo-box. The same holds for the electrical current range.

Currently selected are volume flow and 4-20 mA HART NAM.

The field device F1 possesses a 4-20 mA current output, wherein the value 20 mA corresponds to a flow of 10,000 l/sec. The measuring mode is set on standard and the time constant amounts to 3 sec. A malfunctioning of the device is signaled by a minimum electrical current value.

With this graphical user interface, a simple servicing of the field device F1 is possible. Device parameters can be read out and changed.

Essential advantages offered by the method of the invention include that, for servicing field devices, no complicated software components (device DTMs) more must be produced. The software extension component DLL-F1 is generated directly from the program code of the device software DS. In this way, no programming effort at all arises for producing this software component. The test effort is also significantly lessened, since equal functionality is automatically assured, because the software extension component DLL-F1 and the device software DS operate based on the same program code. Therewith, also without effort, a 100% offline servicing can be done.

In the case of a change of the device software, only the program code (C, or C++ code) must be compiled twice with the appropriate compilers.

Due to these advantages, the method of the invention is very cost effective.

The invention is naturally not only suited for FDT interfaces, but, instead, also for other interfaces, such as that especially provided for the manufacturing industry, the TCI-interface (Tool Calling Interface).

The invention is suited especially also for Pocket PCs with Windows CE as operating system.

The invention claimed is:

1. A method for servicing a field device of automation technology connectable with a computer unit running an operating program for field devices, wherein the operating program comprises a frame application and an executable software component designed for the field devices, wherein the executable software component encapsulates the field devices' servicing functionalities, wherein the executable software component designed for the field device is divided into a generic basic software component and a software extension component, and wherein the generic basic software component is a Device Type Manager (DTM-F1'), and the software extension component is a Windows Dynamic Link Library (DLL-F1), the method comprising the steps of:

using the generic basic software component for reading and writing of device parameters of the field devices and for providing a graphical, basic, user interface; and using the software extension component to deliver the service functionality of the field devices, wherein:

in case the device DTM (DTM-F1'), produces a write command for a device parameter, then this together with the value of the device parameter are forwarded via a communication Device Type Manager (COM-DTM), to the field device and transferred to a device software (DS-F1), which executes the write command;

the communication DTM (COM-DTM), forwards this write command, also simultaneously to the DLL-F1, so that said parameter is written into the DLL-F1 with the same value;

in case of an offline servicing, i.e. the field device F1 is not physically present, the writing and reading of device parameters occurs only between the device DTM, DTM-F1', and the software extension component DLL-F1, the software extension component delivers properties of device parameters requires for presentation on the graphical, basic, user interface;

the software extension component serves for calculating menu structures presented on the graphical, basic, user interface.

2. The method as claimed in claim 1, wherein:
the basic software component is a device DTM (Device Type Manager) meeting the FDT (Field Device 1000-specifications and the software extension component is a Windows DLL (Dynamic Link Library) file.

3. The method as claimed in claim 1, wherein:
during reading and writing of device parameters via the basic software component, values of the device parameters are transmitted to the software extension component.

4. The method as claimed in claim 1, wherein:
program code for the device software is written in the programming language C or C++.

5. A computer unit having a processor executing software instructions for the servicing of a field device by way of the method according to claim 1.

6. A method for servicing a field device of automation technology connectable with a computer unit running an operating program for field devices, wherein the operating program comprises a frame application and an executable software component designed for the field devices and wherein the executable software component encapsulates encapsulating their the field devices' servicing functionalities, and wherein a device software executable in the field device, and wherein the executable software component designed for the field device is divided into a generic basic software component and a software extension component, the method comprising the steps of the executable software component designed for the field device is divided into a generic basic software component and a software extension component;

using the generic basic software component for reading and writing of device parameters of the field device and for providing a graphical, basic, user interface, the generic basic software component is a Device Type Manager (DTM-F1');

using the software extension component is produced from the program code of the device software to deliver the service functionality of the field device; and using the software extension component to deliver the service functionality of the field device, wherein:

the software extension component is a Windows Dynamic Link Library (DLL-F1);

the software extension component is produced from a program code of a device software, which device software is executable in the field device;

in case the Device Type Manager (DTM-F1), produces a write command for a device parameter, then this together with the value of the device parameter are forwarded via a communication Device Type Manager (COMDTM), to the field device and transferred to the device software DS-F1, which executes the write command;

Device Type Manager (COM-DTM), forwards this write command, also simultaneously to the DLL-F1, so that the same parameter is written into the DLL-F1 with the same value; and in case of an offline servicing, i.e. in case a field device F1 is not physically present, the writing and reading of device parameters occurs only between the device DTM (DTM-F1'), and the software extension component DLL-F1.

\* \* \* \* \*